United States Patent [19]

Penzias

[11] Patent Number: 5,311,594
[45] Date of Patent: May 10, 1994

[54] FRAUD PROTECTION FOR CARD TRANSACTIONS

[75] Inventor: Arno A. Penzias, Highland Park, N.J.

[73] Assignee: AT&T Bell Laboratories, Murray Hill, N.J.

[21] Appl. No.: 37,787

[22] Filed: Mar. 26, 1993

[51] Int. Cl.$^5$ .................................. H04K 1/00
[52] U.S. Cl. ........................ 380/23; 380/25; 380/24
[58] Field of Search ............... 380/23, 24, 25

[56] References Cited

U.S. PATENT DOCUMENTS

| | | | |
|---|---|---|---|
| 5,025,373 | 6/1991 | Keyser et al. | 380/24 |
| 5,097,505 | 3/1992 | Weiss | 380/23 |
| 5,127,043 | 6/1992 | Hunt et al. | 379/88 |
| 5,193,114 | 3/1993 | Moseley | 380/23 |

*Primary Examiner*—David C. Cain
*Attorney, Agent, or Firm*—Eugene J. Rosenthal; Barry H. Freedman

[57] ABSTRACT

The problems of fraud in card transactions can be reduced by, after requiring the person engaged in the card transaction to initially identify himself, such as by supplying a card number, a) requesting, the person to supply as authentication information either 1) a randomly selected piece of prestored information or 2) information derived from a randomly selected piece of prestored information; and b) completing the transaction only if the authentication information requested is correctly supplied. The authentication information requested is described in terms of its nature, i.e., what it represents, so that one can not deduce from the request the correct response without knowing the selected prestored piece of information. Since the authentication information is randomly determined for each card transaction, a thief will rarely, if ever, be able to successfully complete a card transaction simply by supplying, in response to a request, the same piece of authentication information last supplied by the authorized person. Each authorized person already knows the particular pieces of information that are prestored for him, e.g., birthdate of spouse, year of school graduation, and mother's telephone number. Thus, he need exert no extra effort to remember them. If the pieces of prestored authentication information are various numbers they may be transmitted over a telephone network from a caller to the authorization system using currently available dial pads and DTMF signaling.

18 Claims, 6 Drawing Sheets

| CARD NUMBER LENGTH | ISSUER ID | QUERY PROTOCOL | ISSUER NAME |
|---|---|---|---|
| 13 | 4128 | IXC CCS | CITIBANK VISA |
| 14 | 9082-9089 | LEC CCS | NEW JERSEY BELL |
| 14 | 2012-2019 | LEC CCS | NEW JERSEY BELL |
| 14 | 2122-2129 | LEC CCS | NYNEX |
| 14 | 5080-5081 | IXC CCS | AT&T TELEPHONE |
| 15 | 340000-349999 | IXC CCS | AMERICAN EXPRESS |
| 15 | 370000-379999 | IXC CCS | AMERICAN EXPRESS |
| 16 | 4784 | IXC CCS | AT&T UNIVERSAL VISA |

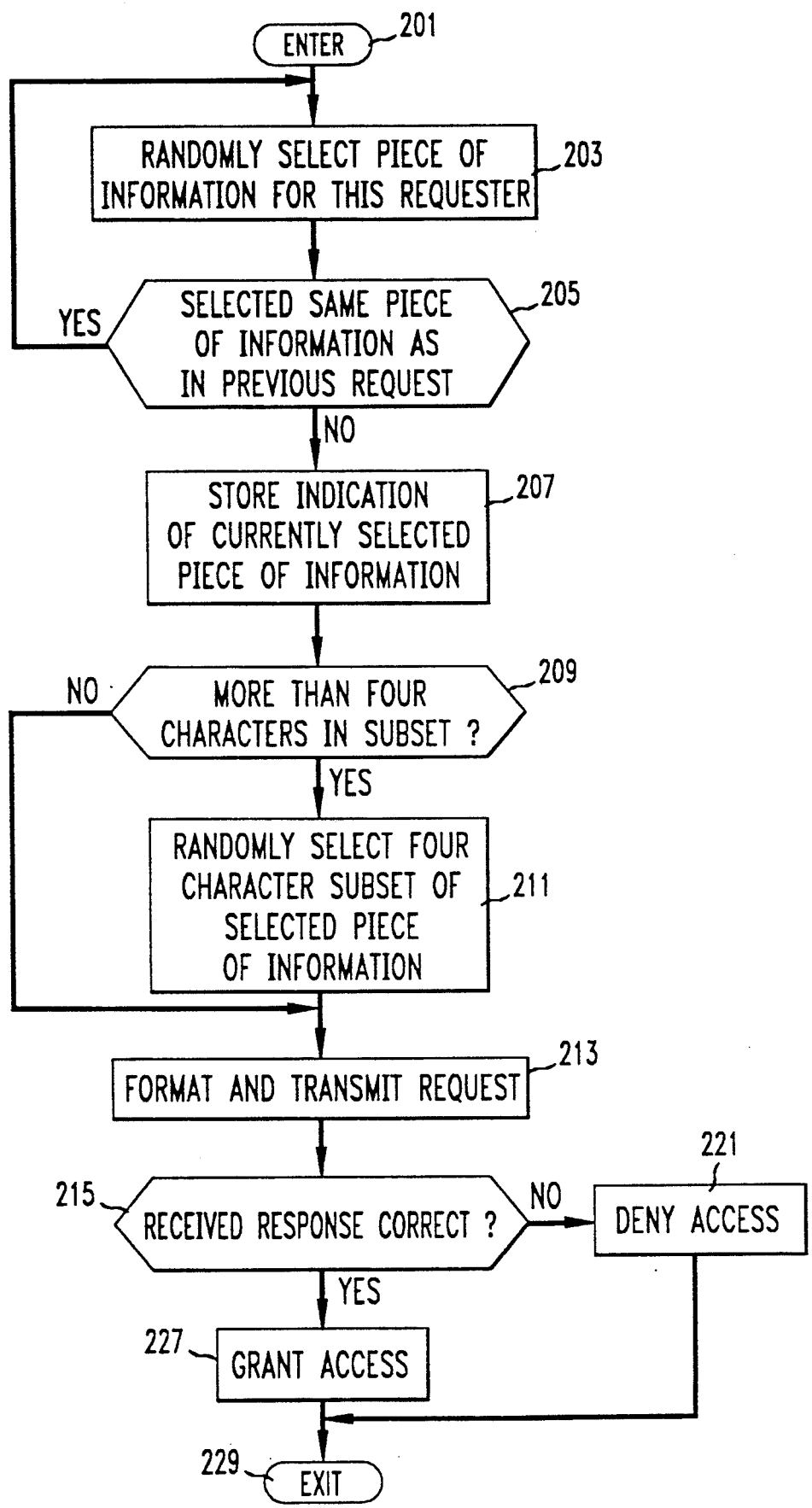

FIG. 3

| CARD NUMBER | BIRTH DATE | STREET ADDRESS | ZIP CODE | SOCIAL SECURITY | GRADUATION YEAR | MOTHER'S PHONE NUMBER |
|---|---|---|---|---|---|---|
| 4784 9999 8888 9999 | 12/16/25 | 1212 | 84362 | 888 998 888 | 1492 | 348 001 4651 |
| 201 501 3433 1333 | 05/31/63 | 8195 | 07733 | 999 89 7777 | 1842 | 201 563 6767 |
| 5681 555 4777 6823 | 09/22/68 | 1772 | 11229 | 925 77 6824 | 1776 | 928 908 9976 |
| 4128 999 999 777 | 04/16/35 | 12052 | 90210 | 927 89 1976 | 1812 | 548 607 8731 |
| 37999 9999 999 888 | 04/22/66 | 133 | 11230 | 888 88 8888 | 1860 | 495 415 6215 |
| 212 555 1234 5678 | 11/25/63 | 416 | 08904 | 987 65 9999 | 1876 | 835 105 1932 | ent
FRAUD PROTECTION FOR CARD TRANSACTIONS

TECHNICAL FIELD

This invention relates to the processing of transactions charged to credit cards and the like, and more particularly, to the reduction of fraudulent use of such cards.

BACKGROUND OF THE INVENTION

As used herein, the term "card" refers to any type of credit card or credit account mechanism including, but not limited to: a) a telephone-company-issued card, such as the Bell Atlantic IQ Card, b) a combined commercial credit card and telephone card, such as the AT&T Universal Card, c) a commercial credit card, such as an American Express card or a VISA card, or d) a debit card. A "card number" is a multi-character string that identifies the account associated with a card. A "card call" is a telephone call whose cost is charged to the account associated with a card. Other common ways of referring to a "card call" are: a) a call charged to a card, or b) a call charged to a card number. It will be appreciated that card issuers, i.e., the providers of the credit for each card, need not provide a tangible manifestation, such as embossed plastic, for each card.

Using a card call as an example, currently, a caller who places a call to be charged to a card must enter all of the digits of his card number and the associated personal identification number (PIN), if any, for each such call. It is noted that, depending on one's perspective, the characters comprising a PIN may or may not be considered as an integral part of the card number. Either way, however, there is a single piece of information, usually the PIN, which the issuer believes only an authorized user of the card would know, and this authentication information must be supplied before a card call, or any transaction charged to a card, is permitted to proceed.

The advantages of such a system are 1) that it is easy to ubiquitously implement at low cost, through the use of telephone dial pads and dual tone, multi-frequency signaling (DTMF), because the card number and authentication information are all sets of letters or digits and 2) the authorized user need not remember a large amount of information that he didn't already know. However, a drawback of such a system is that the card number and the PIN may be stolen by an unscrupulous person who observes their entry by a caller at a telephone key pad. The thief can then make calls and charge them to the card, by supplying the stolen card number and PIN. Theft of service may continue until the unusual calling pattern is noticed by the card owner or the card issuer and the card number and/or PIN is changed.

Well known prior art solutions to overcome this drawback have proposed that information representing measurements of various physical characteristics of an authorized person, such as voice prints, finger prints, retina patterns, etc., be used as authentication information in conjunction with, or instead of, the PIN. While measurement of physical characteristics for authentication can greatly reduce the fraud problem, there remain technological and cost obstacles to incorporating this technique in a generally available fraud prevention system.

SUMMARY OF THE INVENTION

The problems of fraud in card transactions, as well as in other access request contexts, can be reduced or overcome, in accordance with the principles of the invention, by, after requiring the person engaged in the card transaction to initially identify himself, such as by supplying a card number, a) requesting, the person to supply as authentication information either 1) a randomly selected piece of prestored information or 2) information derived from a randomly selected piece of prestored information; and b) completing the transaction only if the authentication information requested is correctly supplied. The authentication information requested is described in terms of its nature, i.e., what it represents, so that one can not deduce from the request the correct response without knowing the selected prestored piece of information. Since the authentication information is randomly determined for each card transaction, unlike the prior art systems, advantageously, a thief will rarely, if ever, be able to successfully complete a card transaction simply by supplying, in response to a request, the same piece of authentication information last supplied by the authorized person. Advantageously, each authorized person already knows the particular pieces of information that are prestored for him. Thus, he need exert little or no extra effort to remember them. Furthermore, in accordance with an aspect of the invention, if the request for authentication information is made so that the thief can not overhear it, the thief will be unable to determine why the particular authentication information was supplied and, therefore, advantageously, will be unable to determine a correct response to a request even after observing the authorized person supplying a large number of responses.

In one embodiment of the invention, the pieces of information are various numbers, i.e., ordered sets of digits, prestored in an authorization system. Advantageously, this permits ubiquitous low cost implementations because the numbers may be transmitted from a caller engaged in a card transaction to the authorization system using currently available dial pads and dual tone, multi-frequency signaling. The stored numbers have meanings that are unique to the authorized person, e.g., birthdate of spouse, street address, zip code, social security number, year of high school graduation, and mother's telephone number. A caller making a card call, after identifying himself, such as by entering his card number, is requested by the authorization system, using an automated speech unit, to enter the values of, for example, 4 digits. The values of the particular 4 digits to be entered are described in the request in terms of randomly selected digit positions of a randomly selected one of the pieces of prestored information. Thus, for example, to authenticate a first call, the request may be for the third through sixth digits of the caller's mother's telephone number, while to authenticate a second call the request may be for the last 4 digits of the caller's social security number. If he knows them, the caller enters the values of the requested 4 digits by pressing the corresponding keys on the telephone key pad. The dual tone, multi-frequency signals thereby generated are received by the authorization system and the corresponding digit values determined. The received digit values are compared to the values of the requested digits and, if they match, the call is allowed to proceed. Otherwise, the call is denied.

It is noted that, according the invention, the determination of a correct response is content-based. In other words, the person to be authenticated must know and supply a response that has a particular information content, i.e., value, and it is the information content that is determinative as to the correctness of the response. Thus, a correct response depends on what the person to be authenticated knows, rather than on his physical characteristics. This is different from a prior art system in which a person to be authenticated is prompted to speak certain particular utterances, which are selected at random from a group of prestored utterances. In such a prior art system, the value of the utterances to be supplied are given as part of the prompt to the person to be authenticated who need not know the content, or meaning, of that which he is to utter. In fact, the utterances need not have any particular meaning at all and may be just a prescribed collection of sounds. For such a prior art system, authentication is performed by determining if the utterances received were, more likely than not, uttered by an authorized person—based on their sound characteristics. At no time is the person to be authenticated required to know any information that is not supplied to him as part of the authentication process. An advantage of the instant invention over the prior art is that less memory and less processing capability are required.

BRIEF DESCRIPTION OF THE DRAWING

In the drawing:

FIG. 2 shows a flow chart of an exemplary process used by the security gateway of FIG. 1 for determining whether or not to grant access to a resource;

FIG. 3 shows an exemplary structure for the information stored in the exemplary account table of the security gateway of FIG. 1;

DETAILED DESCRIPTION

Figures 1, 5:
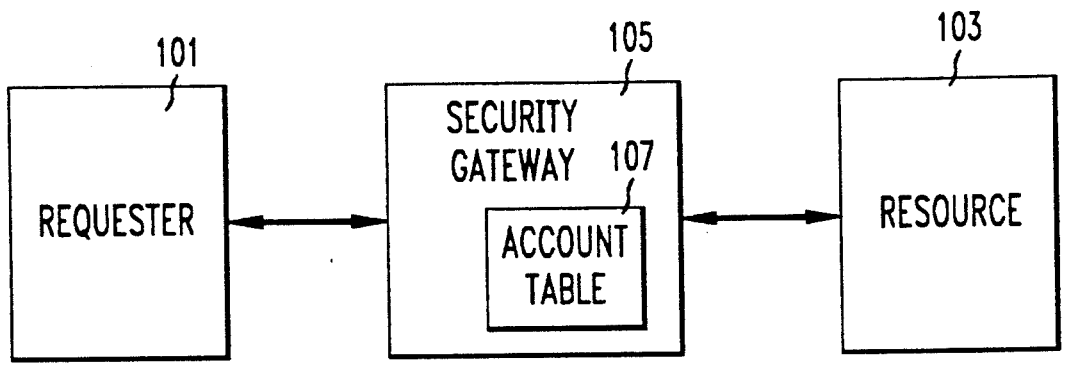
FIG. 1 shows a block diagram of the general environment in which the invention is to be applied.
FIG. 5 shows an exemplary structure for the information stored in the card recognition data base of FIG. 4.

FIG. 1 shows a block diagram of the general environment in which the invention is to be applied. As shown, requester 101 is seeking access to resource 103, which is protected by security gateway 105, an access authorization system.

In accordance with the principles of the invention, requester 101 must a) identify himself to a security gateway 105, in which several pieces of personal information are prestored and b) supply, in response to a request from security gateway 105 as authentication information either 1) a random one of the stored pieces of information or 2) a piece of information that is derived from a randomly selected one of the stored pieces of authentication information. The authentication information requested is described in terms of its nature, i.e., what it represents, so that one can not deduce from the request the correct response without knowing the selected prestored piece of information. Security gateway 105 grants access to the resource only if the authentication information requested is correctly supplied. The invention may be used where the resource to be accessed is an account, such as a credit, fund, or computer access account, which only particular authorized individuals can use.

To effectuate the invention, security gateway 105 contains account table 107 in which is stored identity information, e.g., the account numbers, of persons authorized to access resource 103. Also stored in account table 107, for each account number stored therein, are several pieces of information that only a person authorized to access resource 103 using that account number is likely to know, in accordance with the principles of the invention. For example, the pieces of information stored in account table 107 may include: birthdate of spouse, street address, zip code, social security number, year of high school graduation and mother's telephone number. These pieces of information are used to authenticate the identity of requesters who wish to gain access to resource 103.

FIG. 2 shows a flow chart of an exemplary process used by security gateway 105 (FIG. 1) for granting or denying access to resource 103 by authenticating requester 101. Requester 101 is authenticated by comparing his response to a challenge from security gateway 103 with the known response to that challenge. The challenge is supplied to requester 103 in the form of a request for particular information derived from a piece of information stored in account table 107, in accordance with the principles of the invention. The process is entered, in step 201 (FIG. 2), after requester 101 (FIG. 1) supplies to security gateway 105 an account number and that account number has been located in account table 107.

In step 203 (FIG. 2), security gateway 105 (FIG. 1) selects at random one of the pieces of information stored for the requester supplied account number. Conditional branch point 205 (FIG. 2) tests to determine if the selected piece of information is the same piece of information that was selected for the immediately preceding request. This test is performed by comparing an indication of the selected piece of information with a stored indication of the piece of information used in the immediately preceding challenge. If the test result in-step 205 is YES, control passes back to step 203, so that another piece of information may be randomly selected. If the test result in step 205 is NO, control passes to step 207, in which an indication of the currently selected piece of information is stored for use in subsequent iterations of conditional branch point 205.

Next, conditional branch point 209 tests to determine if the selected piece of information has more than a particular predetermined number of characters, e.g., 4. If the test result in step 209 is YES, control passes to step 211, in which a subset of the characters of the selected pieces of information is selected at random. The subset may be described in terms of the position of the characters in the piece of information and the characters of the subset need not be in the same order that they appear in the selected piece of information, nor need they appear contiguously therein. For example, if mother's phone number is one of the stored pieces of information, and it is selected in step 203, the subset selected in step 211 could be the first, sixth, third and fourth digits of the mother's phone number. Control then passes to step 213. If the test result in step 209 is NO, control passes to step 213 directly.

In step 213 a request for the selected characters of the selected piece of information is formatted and transmitted to the requester. This step may be performed by 1) transmitting digital messages, 2) by directly communicating the request, e.g., via a telephone line, to the requester or 3) a combination of messages and direct communication. For example, a directly communicated request could be the speaking, by an automated speech system of "please enter the first, sixth, third and forth digits of your mother's telephone number." Security gateway 105 also stores an indication of the characters requested so that they may be compared with the characters supplied by the requester. Conditional branch point 215 tests to determine if a proper response is received from the requester. A response could be supplied in the form of signals corresponding to characters selected by pressing keys at a keyboard. If the test result in step 215 is YES, i.e., the requested selected characters are correctly supplied by the requester, control passes to step 217, and security gateway 105 grants the requester access to resource 103. The process then exits via step 219. If the test result in step 215 in NO, i.e., either incorrect characters or none at all are received, control passes to step 219, and security gateway 105 denies the requester access to resource 103. The process then exits via step 219.

The invention is believed to be particularly useful in controlling access to credit via card accounts, especially where the access to be granted is the completion of a card call. FIG. 3 shows an exemplary structure for the information stored in an exemplary account table 107 for use in card applications. An entry for each issuer is made up of several fields, including a) card number field 303, which corresponds to the account number described above, b) spouse's birthdate field 305, c) street address field 307, d) zip code field 309, e) social security number field 311, f) year of high school graduation field 313, and g) mother's telephone number field 315. Each of the fields other than card number field 303 stores for each card number one of the pieces of information noted above for use with the invention. The pieces of information stored are preferably ones that an authorized person would know yet are unlikely to be written on an item carried by an authorized person in a wallet or purse, which, if stolen, would compromise the security.

It is noted that not all the fields for a card number need be filled, i.e., some of the fields may be blank. Such blank fields may be caused by the authorized individual, when he is initially supplying the pieces of information to be stored in account table 107, not knowing the information required to fill particular ones of the blank fields while the information requested for others of the blank fields may not be applicable to him. If there are blank fields, the randomly selected piece of information in step 203 (FIG. 2) is selected only from the fields that are not blank.

Figure 4:
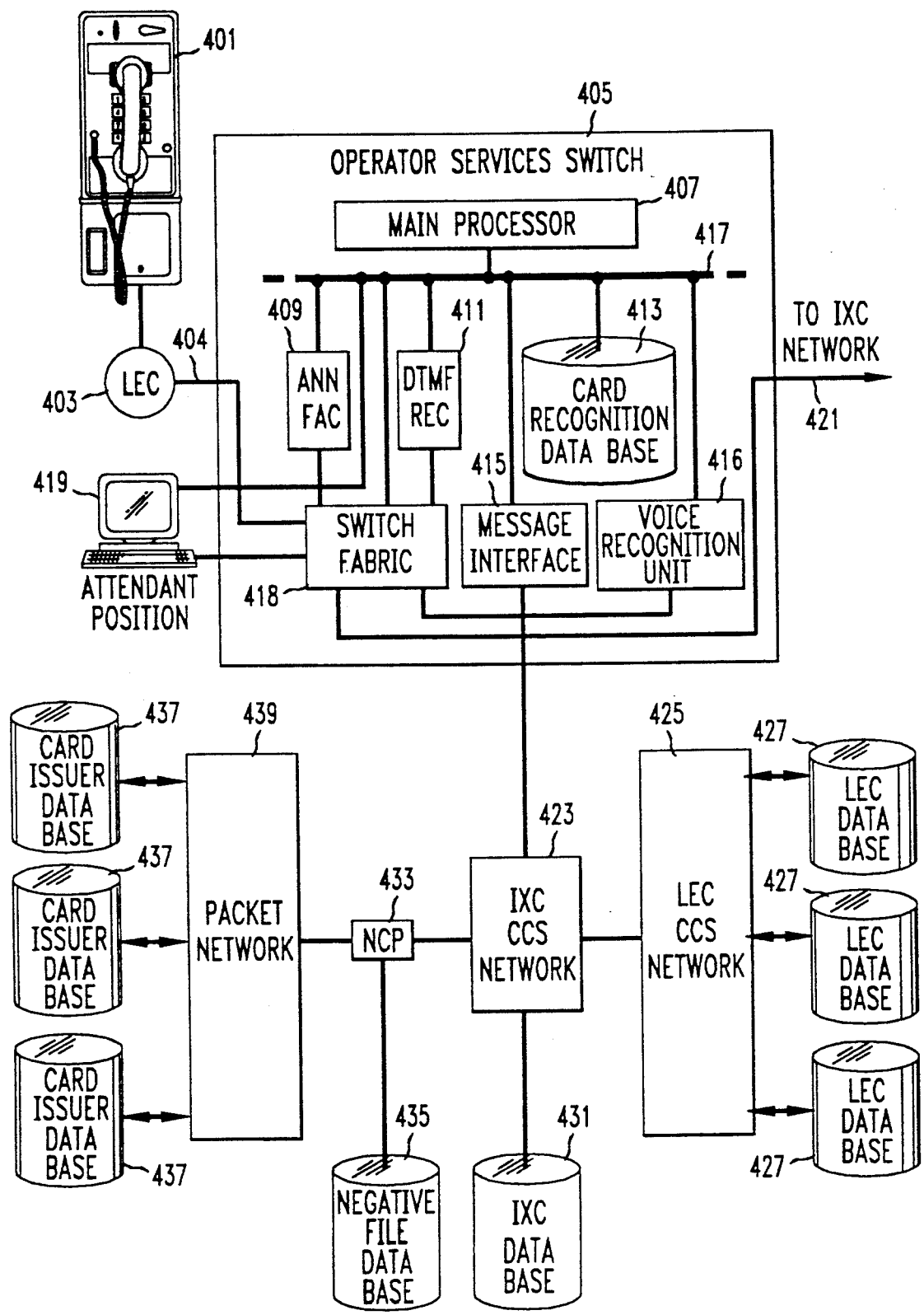
FIG. 4 shows exemplary apparatus for use in processing card calls in accordance with the principles of the invention.

FIG. 4 shows exemplary apparatus for use in processing card calls in accordance with the principles of the invention. A calling party originates a card call at telephone station 401 by a) dialing 0+area code+number or b) access code+0+area code+number. A switch of local exchange carrier (LEC) 403 receives the dialed digits and, from the dialed 0, recognizes that the call is an operator services type of call that may be a card call. Therefore, local exchange carrier (LEC) 403 routes the call to operator services switch 405 for further handling. Operator services switch 405 is a switch that, given the description hereinbelow, can be designed by applying those principles well known to those skilled in the art, to provide special operator type calling services to calling parties, including functionality for realizing the principles of the invention.

If an access code for a specific interexchange carrier (IXC) is not specified as part of the digits dialed by the calling party but yet the call must be carried by an interexchange carrier, local exchange carrier 403 routes the call over a trunk, e.g., trunk 404, to operator services switch 405 of an interexchange carrier. Local exchange carrier 403 is aware of a default interexchange carrier to which telephone station 401 has been assigned. If the dialed digits include an access code specifying a particular interexchange carrier, local exchange carrier 403 routes the call over a trunk to an operator services switch 405 of the specified interexchange carrier. If the call is one which is not to be carried by an interexchange carrier, local exchange carrier 403 routes the call to one of its own operator services switches.

Operator services switch 405 includes: a) main processor 407, b) announcement facility (ANN FAC) 409, c) dual tone multi-frequency receiver (DTMF REC) 411, d) card recognition data base 413, e) message interface 415, f) bus 417, g) switch fabric 418 and h) voice recognition unit 416. Main processor 407 controls the overall operation of operator services switch 405 by performing any necessary processing and exchanging messages with the other components of operator services switch 405 over bus 417. Announcement facility (ANN FAC) 409 can make various announcements which can be heard by the calling party. The announcements, or combinative portions thereof, are prestored in announcement facility (ANN FAC) 409. They are accessed by supplying announcement facility (ANN FAC) 409 with pointers to the announcements. In accordance with the invention, such combinative portions include the name (description) of the prestored pieces of information. The portions may also include, in accordance with an aspect of the invention, the various digit positions that may be requested.

Dual tone multi-frequency receiver (DTMF REC) 411 receives dual tone multi-frequency signals that are transmitted in response to the pressing of keys on the keypad of telephone station 401 and supplies the digit corresponding to each pressed key to main processor 407. Card recognition data base 413 contains at least the information necessary to determine from the digits supplied by a calling party the issuer of the card to which the call is to be charged. Message interface 415 is a protocol conversion unit that permits operator services switch 405 to communicate with a common channel signaling (CCS) network, such as IXC CCS network 423. It is responsible for formatting all messages transmitted to IXC CCS network 423 and for extracting responses received from IXC CCS network 423. In particular, as described in more detail below, card validation query messages and authentication query messages are transmitted to IXC CCS network 423 while card valid or invalid response messages and authentication verification messages are received therefrom.

At various times during a call, switch fabric 418 connects the trunk on which the calling party's call arrived at operator services switch 405, e.g., trunk 404, to announcement facility (ANN FAC) 409 or dual tone multi-frequency receiver (DTMF REC) 411. The purposes of such connections are described further below. Once the authentication and billing for a call has been attended to, and the call can be routed to its ultimate destination, switch fabric 418 connects the trunk on which the calling party's call arrived to the rest of the interexchange carrier's network, via link 421.

Attendant position 419, staffed by a human attendant, also interfaces with operator services switch 405 via both bus 417 and switch fabric 418. The interface via bus 417 permits the attendant to exchange information with main processor 407. The interface via switch fabric 418 allows the attendant to converse with the calling party.

IXC CCS network 423 can route queries for card number validation and for authentication a) to LEC CCS network 425 and ultimately to one of LEC data bases 427, b) to IXC data base 431 or c) to network control point (NCP) 433 and ultimately to either negative file data base 435 (not for authentication query messages) or one of card issuer data bases 437, via packet network 439. NCP 433 is a unit of known type that interfaces with packet network 439 and negative file data base 435 so as to present the information contained therein to IXC CCS network 423 as if it originated from a single data base.

Negative file data base 435 contains a list of so-called "hot cards". Hot cards are cards that are known to be invalid, e.g., card that were reported stolen. Using such a data base speeds the processing of each call attempted using a hot card in that it avoids a full search of the data base of the card issuer. The list of hot cards is supplied periodically by the commercial card issuers. All the other data bases contain at least listings of valid card numbers against which the card number supplied by the calling party is compared. Furthermore, if the other data bases are implemented in accordance with the invention, they also contain, for each valid card number stored therein, several pieces of information that only a person authorized to make charges to that card number was likely to know. Thus, collectively, the data bases other than negative file data base 435 store account table 107 (FIG. 1). If the card number is not found in the hot card list of negative file data base 435 (FIG. 4), a card validation query is sent via packet network 439 to the card issuer data base 437 maintained by the particular card issuer.

Calling cards issued by telephone companies have telephone-line-number-based numbers, which comprise 1) a subscriber's telephone number plus 2) a 4 digit PIN. These cards can be distinguished from commercial credit cards on the basis of the length of their card numbers. Other cards having numbers of the same length as telephone-company-issued-line-number-based cards are distinguished therefrom by properties which make the numbers of the other cards invalid as telephone numbers, such as having a zero as the fourth digit. Should some of the card numbers of two or more card issuers overlap, with no distinguishable features between them, it may be necessary to prompt the calling party for an indication of the issuer of the card that the calling party is using. Such prompting, as well as the receiving of the indication, would be performed by announcement facility (ANN FAC) 409 and dual tone multi-frequency receiver (DTMF REC) 411 working under the control of main processor 407.

FIG. 5 shows an exemplary structure for the information stored in card recognition data base 413. An entry for each issuer is made up of several fields, including a) card number length field 500, b) issuer identification (ID) field 502, c) query protocol field 504, d) issuer name field 508. Card number length field 500 contains the length, i.e., the number of digits, of the card numbers issued by a particular card issuer. The issuer identification (ID) field 502 contains a code or range of codes, up to 7 digit in length, that uniquely identifies the card issuer. Although any number of digits may be used, 7 digits was selected because a) it includes 6 digits, which is the maximum number of digits required under the ISO standard for identifying card issuers and b) it can also accommodate particular telephone-company-issued calling cards such as those that begin with "89". The card number typically includes both a prefix identifying the card issuer and an account number indicating the individual account, so that the issuer identification (ID) field is the first group of numbers embossed on the card as its number. Advantageously, then, in the preferred embodiment, main processor 407 need only examine a) a card's prefix and b) its length to determine the card issuer.

Each card issuer may specify its own format to which queries for validation of card numbers or authentications must conform in order to be processed. Query protocol field 504 contains indications that specify the proper format for each card issuer. These indications are used by main processor 407 (FIG. 4) to build query messages requesting validation of card numbers or authentication of a caller in response to authentication information supplied by the caller. The query messages are transmitted via message interface 415 to IXC CCS network 423 and ultimately to the proper data base. Issuer name field 508 contains the name of the card issuer.

Figure 6:
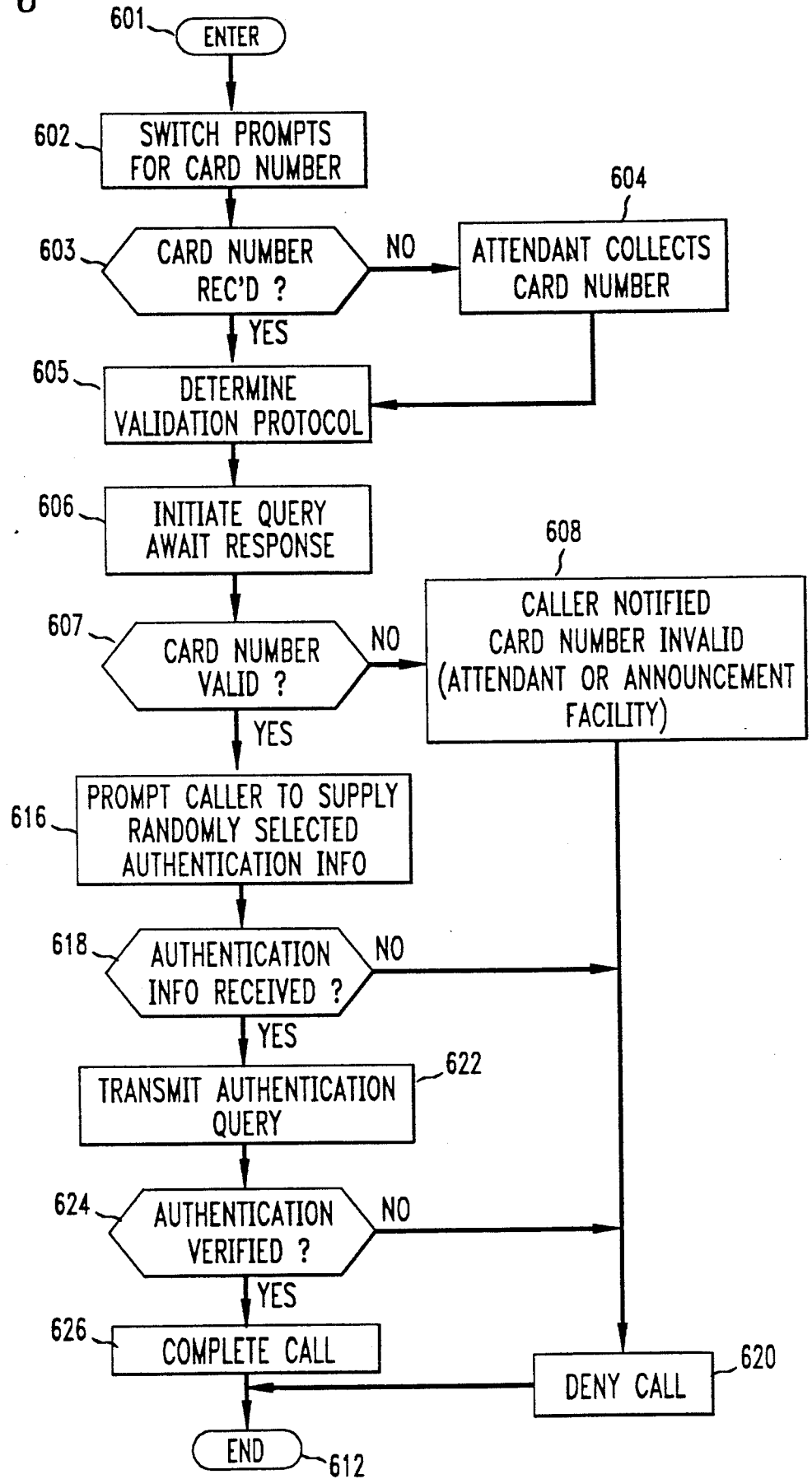
FIG. 6 shows a flow chart of a process for validating a card number in accordance with the principles of the invention.

FIG. 6 shows a flow chart of a process for validating a card number in accordance with the principles of the invention. The process is entered, in step 601, when a caller at telephone station 401 (FIG. 4) initiates a 0+ type of telephone call. The call information, including the dialed digits, is routed by LEC 403 to operator services switch 405. In step 602 (FIG. 6) operator services switch 405 prompts the calling party to supply his card number. To do so, switch fabric 418 connects announcement facility (ANN FAC) 409 to trunk 404 on which the calling party's call was received.

The calling party may supply the card number by pressing keys on the keypad of telephone station 401, thereby generating dual tone multi-frequency signals representing the card number. If signals are so generated, dual tone multi-frequency receiver (DTMF REC) 411 receives and translates them. To this end, switch fabric 418 connects the trunk at which the calling party's call is terminated to dual tone multi-frequency receiver (DTMF REC) 411. The resulting translated digits are supplied to main processor 407, via bus 417.

Conditional branch point 603 tests to determine if main processor 407 received the digits of a card number within a predetermined length of time. If the test result in step 603 is NO, control is passed to step 604, in which an attendant, at attendant position 419, converses with the calling party and has him verbally supply the card number if the call is a card call. The attendant then enters the card number supplied by the calling party into attendant position 419 which, thereafter, transmits it to operator services switch 405. Control then passes to step 605. If the test result in step 603 is YES, indicating that main processor 407 received the digits of a card number within a predetermined length of time, control passes to step 605 directly.

Operator services switch 405 determines the appropriate query protocol based on the card number that was received, in step 605. The appropriate query protocol is determined by matching a prefix portion of the digits of the received card number with those listed in issuer ID field 502 (FIG. 5) of card recognition data base 413 for card numbers that have the same length as the received card number. The corresponding query protocol is, thereafter, retrieved from query protocol field 504.

In step 606, a validation query is initiated by operator services switch 405 and a response is awaited. The query is transmitted via message interface 415 to IXC CCS network 423, which routes the query appropriately. Conditional branch point 607 tests to determine, upon receipt of a response to the validation query, if the response received indicates that the card number supplied was valid. If a valid card number was supplied, the response to the validation query includes an indication of the authentication information derived from a randomly selected prestored piece of information that the caller must supply before the call can be completed, in accordance with an aspect of the invention. The authentication information to be supplied was determined by the database performing the process shown in steps 201 through 213 of FIG. 2.

If the test result in step 607 is NO, control passes to step 608, in which the caller is notified of the invalidity of the supplied card number, by way of an announcement from announcement facility (ANN FAC) 409. Alternatively, if the call is handled by an attendant, the attendant will inform the calling party that the card number supplied is invalid. Additionally, regardless of how the announcement is presented, the caller could be transferred, automatically or in response to prompting, to a customer service representative of the card issuer, if his card is denied. Such a transfer would be accomplished by switch fabric 418 working under the control of main processor 407. Alternatively, a telephone number for customer service of the card issuer could be supplied to the caller as part of the invalidity announcement.

If the test result in step 607 is YES, control passes to step 616 in which the caller is prompted to supply the authentication information indicated in the response to the validation query. If the call was automatically handled, announcement facility (ANN FAC) 419 generates the announcement for presentation to the calling party. Switch fabric 418 couples announcement facility (ANN FAC) 419 to trunk 404 at which the calling party's call is terminated so that the calling party can hear the announcement. If the call was handled by an attendant at attendant position 419, operator services switch 405 causes the request to be displayed at attendant position 419 so that the attendant may read the request for the authentication information to the caller.

Control then passes to conditional branch point 618 which tests to determine if the requested authentication information was received from the caller. The requested authentication information may be supplied by the caller pressing keys on the dial pad of telephone 401 or by his speaking the authentication information to an attendant who then enters the information into attendant position 419. If the test result in step 618 is YES, control passes to step 622, in which an authentication query, including the received authentication information, is transmitted by operator services switch 405 and a response is awaited. The authentication query is transmitted via message interface 415 to IXC CCS network 423, which routes the query the appropriate database.

The database to which the query is received compares the authentication information contained in the query to that which it requested. If the authentication information is proper, i.e., the correct digits were supplied, the database will transmit a response to the authentication query, indicating that the authentication has been verified. Conditional branch point 624 tests to determine, upon receipt by operator services switch 405 of a response to the authentication query, if the response received indicates that the authentication has been verified, i.e., that the authentication information supplied was correct. If the test result in step 624 is YES, control passes to step 626 and the call is completed. Thereafter, the process exits via step 628. If the test result in steps 618 or 624 is NO, control passes to step 620 and the call is denied. Thereafter, the process exits via step 628.

Figure 7:
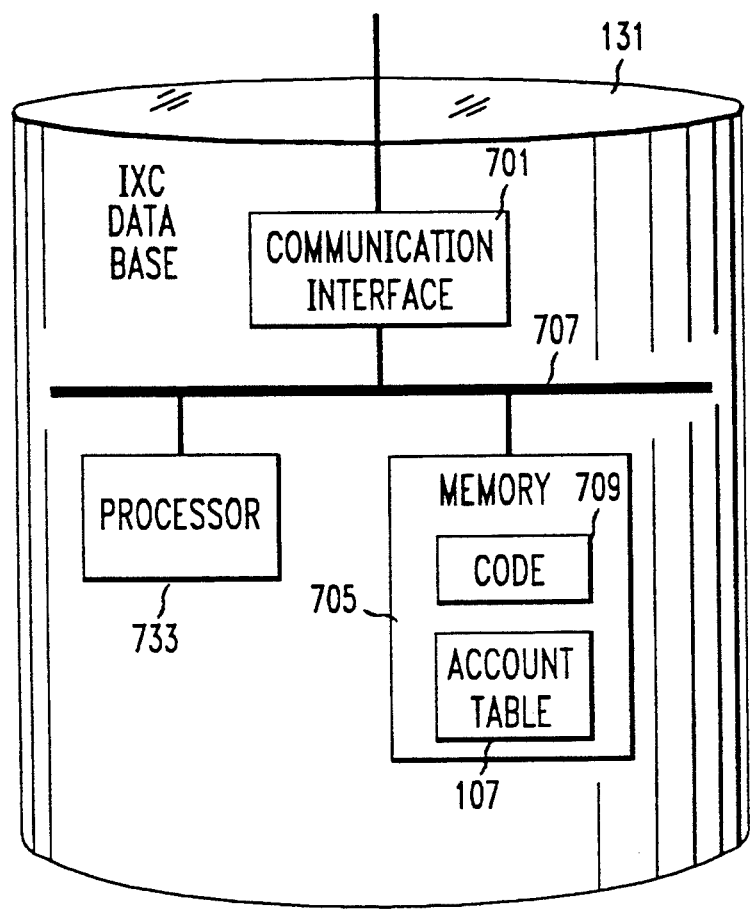
FIG. 7 shows a block diagram view of an exemplary IXC data base shown in FIG. 4.

FIG. 7 shows a block diagram view of IXC data base 431 (FIG. 4). Shown are a) communication interface 701 (FIG. 7), b) processor 703, and c) memory 705 connected via bus 707. Communication interface 701 is a protocol conversion unit that permits IXC data base 431 (FIG. 4) to communicate with a common channel signaling (CCS) network, such as IXC CCS network 423 and ultimately with operator services switch 405. It is responsible for formatting all messages transmitted by IXC data base 431 to IXC CCS network 423 and for extracting responses received from IXC CCS network 423. In particular, responses to the validation queries and authentication verification messages are transmitted to IXC CCS network 423 while validation queries and authentication queries and are received therefrom. Processor 703 (FIG. 7) provides all the computational capability necessary to control all the processes of IXC data base 431. Memory 705 includes 1) code portion 709, which contains the instructions (program) used by processor 703 to control the processes of IXC data base 431 and 2) the portion of account table 107 (FIGS. 1,3), described above, for those cards issued by the IXC. Code portion 709 (FIG. 7) includes instructions for performing the process shown in FIG. 2 as well as other processes of the prior art for performing card validations. Bus 707 provides for the exchange of data between the components of IXC data base 431 (FIG. 4). LEC data bases 427 and card issuer data bases 437 may be structured similar to IXC data base 431, with each having a portion of account table 107 (FIG. 1) for cards that their respective owners issued.

In other embodiments, announcement facility (ANN FAC) 409 (FIG. 4) can supply announcements that can eventually be perceived by the calling party but are in forms other than voice. For example, announcement facility (ANN FAC) 409 might supply messages that can be displayed on a display incorporated into telephone station 401. In another embodiment, dual tone multi-frequency receiver (DTMF REC) 411 might be replaced with a message receiver that can receive signals other than dual tone multi-frequency signals. These signals would be supplied from telephone station 401 to deliver the card number and authentication information to operator services switch 405. For example, a magnetic card stripe reader could be incorporated into telephone station 401 and supply ISDN-formatted messages containing the card number to operator services switch 405. Alternatively, voice recognition unit 416, which recognizes the digits of the card as spoken by the caller, might be invoked for use in a particular call instead of dual tone multifrequency receiver (DTMF REC) 411. Those skilled in the art will also recognize that, for such embodiments, strings other than strings of digits may be used to identify an account associated with a card.

As described above, unless the PIN is an inherent part of the card number, the request for a random piece of information is made in lieu of the prior art's request for a PIN. It is noted, however, that the invention can be used in conjunction with a PIN to provide an additional level of security. For example, for card calls originating in low fraud areas only the card number and PIN need be provided. However, if a card call originates from a high fraud area, e.g., a bus terminal or an airport, which can be determined based on the automatic number identification (ANI) of the calling telephone station, the invention is invoked after verifying the card number and PIN. When the invention is invoked, an additional, randomly selected, piece of prestored information is requested. Only if the randomly selected piece of prestored information is correctly supplied by the caller will the card call be completed. It is noted that the PIN may be stored in account table 107 (FIG. 1).

The foregoing merely illustrates the principles of the invention. It will thus be appreciated that those skilled in the art will be able to devise various arrangements which, although not explicitly described or shown herein, embody th principles of the invention and are thus within its spirit and scope.

What is claimed is:

1. A method for use in authorizing a card transaction for a particular card, comprising the steps of:
    prestoring a plurality of pieces of information supplied by a person authorized to charge card transactions for said particular card;
    requesting, from a person engaged in a card transaction using said particular card, a piece of information, selected at random from one of said pieces of prestored information, said information being requested being indicated in said request by a description of its nature so that the correct response can not be deduced from the request without knowing the selected prestored piece of information; and
    completing said transaction only if said requested information is correctly supplied.

2. The invention as defined in claim 1 wherein said request is secretly made to said person.

3. The invention as defined in claim 1 wherein said randomly selected piece of information is selected so that the same piece of information is not selected for two successive requests.

4. A method for use in authorizing a card transaction to be charged to a particular card, comprising the steps of:
    prestoring a plurality of pieces of information supplied by a person authorized to charge card transactions for said particular card;
    requesting, from a person engaged in a card transaction using said card, authentication information that is derived from a randomly selected one of said prestored pieces of information, said randomly selected information from which said authentication information is derived being indicated in said request by a description of its nature so that the correct response can not be deduced from the request without knowing the selected prestored piece of information; and
    completing said transaction only if said requested information is correctly supplied.

5. The invention as defined in claim 4 wherein said authentication information requested is the entirety of said randomly selected one of said prestored pieces of information.

6. The invention as defined in claim 4 wherein said randomly selected piece of information is selected so that the same piece of information is not selected for two successive requests.

7. The invention as defined in claim 4 wherein said authentication information is derived so that the same authentication information is not requested for two successive requests.

8. The invention as defined in claim 4 wherein said request is secretly made to said person whereby said request is not detectable by any person other than said person.

9. The invention as defined in claim 4 wherein said person engaged in said card transaction supplies said requested information as dual tone multi-frequency signals.

10. The invention as defined in claim 4 wherein said person engaged in said card transaction supplies said requested information by speaking it.

11. The invention as defined in claim 4 wherein each of said plurality of pieces of information supplied by said authorized person are sets of characters representing a particular item known to said person.

12. The invention as defined in claim 11 wherein said authentication information derived from a randomly selected one of the stored pieces of information is a subset of a randomly selected one of said sets of characters.

13. The invention as defined in claim 11 wherein said characters are digits.

14. The invention as defined in claim 11 wherein said characters are representable by designated keys on a telephone dial pad.

15. A method for use in authenticating a requester who is requesting access to a resource, the method comprising the steps of:
    initially identifying said requester as a particular person; and
    completing the verification by
        (i) requesting that said requester supply a randomly selected piece of information from among a plurality of pieces of information that were prestored for said particular person, said information being requested being indicated in said request by a description of its nature so that the correct response can not be deduced from the request without knowing the selected prestored piece of information,
        (ii) comparing information supplied by said requester in response to said request with said randomly selected piece of information.

16. The invention as defined in claim 15 including the further step of granting access to said resource if said information supplied by said requester matches said randomly selected piece of information.

17. The invention as defined in claim 15 wherein said randomly selected piece of information is selected so that the same piece of information is not selected for two successive requests in which said particular person is initially identified.

18. A method for use in authorizing a card transaction for a particular card, comprising:
    storing a plurality of pieces of information supplied by a person authorized to charge card transactions for said particular card, said pieces of information being stored prior to any card transactions;

requesting, from a person engaged in a card transaction using said card, a value derived from the value of a randomly selected one of the pieces of prestored information without indicating said requested value or said value of said randomly selected one of the pieces of prestored information to said person; and means for completing said transaction only if said requested information is correctly supplied.

* * * * *